(12) United States Patent
Rajkotia et al.

(10) Patent No.: US 7,379,739 B2
(45) Date of Patent: *May 27, 2008

(54) APPARATUS AND METHOD FOR SELECTING A HANDOFF BASE STATION IN A WIRELESS NETWORK

(75) Inventors: Purva R. Rajkotia, Plano, TX (US); William J. Semper, Richardson, TX (US); Joseph Cleveland, Richardson, TX (US); Sanjay Kumar Kodali, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

This patent is subject to a terminal disclaimer.

(21) Appl. No.: 10/294,251

(22) Filed: Nov. 14, 2002

(65) Prior Publication Data
US 2004/0097234 A1 May 20, 2004

(51) Int. Cl.
*H04Q 7/20* (2006.01)
(52) U.S. Cl. .............. 455/439; 455/440; 455/441; 370/331; 370/332
(58) Field of Classification Search ......... 455/436, 455/437, 440, 441, 439; 370/331, 332
See application file for complete search history.

(56) References Cited
U.S. PATENT DOCUMENTS

| | | | | |
|---|---|---|---|---|
| 5,640,676 A | * | 6/1997 | Garncarz et al. | 455/436 |
| 6,052,598 A | * | 4/2000 | Rudrapatna et al. | 455/456.1 |
| 6,061,337 A | * | 5/2000 | Light et al. | 370/331 |
| 6,125,278 A | * | 9/2000 | Wieczorek et al. | 455/437 |
| 6,167,268 A | * | 12/2000 | Souissi et al. | 455/434 |
| 6,320,855 B1 | * | 11/2001 | Shi | 370/332 |
| 6,327,471 B1 | * | 12/2001 | Song | 455/440 |
| 6,564,057 B1 | * | 5/2003 | Chun et al. | 455/437 |
| 6,721,567 B1 | * | 4/2004 | Wang et al. | 455/440 |
| 2001/0011019 A1 | * | 8/2001 | Jokimies | 455/449 |
| 2002/0082017 A1 | * | 6/2002 | Hattori | 455/436 |
| 2004/0121774 A1 | * | 6/2004 | Rajkotia et al. | 455/441 |

* cited by examiner

Primary Examiner—Danh Le

(57) ABSTRACT

An apparatus and method is disclosed for selecting a handoff target base station in a wireless network. The apparatus comprises a handoff controller within a wireless mobile station that selects an optimal target base station for handoff based on pilot signal strength measurements of at least two candidate base stations and one of: a location of the wireless mobile station, a velocity of the wireless mobile station, and a direction of motion of the wireless mobile station. The present invention uses more than just pilot strength measurements to select an optimal target base station for handoff. Incorporating position location information in the handoff decision causes the handoff decision to be more reliable. This reduces the number of unnecessary handoffs and results in better system performance.

20 Claims, 6 Drawing Sheets

APPARATUS AND METHOD FOR SELECTING A HANDOFF BASE STATION IN A WIRELESS NETWORK

TECHNICAL FIELD OF THE INVENTION

The present invention is directed generally to wireless communication networks and, more specifically, to wireless mobile stations that are capable of selecting a target base station for a handoff of a wireless mobile station from a source base station to the target base station.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

Wireless service providers also seek other ways of using the available spectrum as efficiently as possible. One important technique for maximizing spectral efficiency is to minimize overhead message traffic. If the number of overhead messages transmitted is reduced, fewer overhead channels are required to carry overhead messages. This frees up spectrum for user traffic. Also, reducing the number of overhead messages reduces the processing load in both the mobile stations and the base stations of the wireless network.

As is well known, when a wireless mobile station moves from a cell that is served by a source base station to a cell that is served by a target base station it becomes necessary to transfer or "hand off" the wireless mobile station from the source base station to the target base station. In most wireless networks approximately forty percent (40%) to fifty percent (50%) of all active calls experience some type of handoff. These handoffs involve adding cells or dropping cells to an active call, or handing the call over to another cell under the control of another base station. In either case a decision must be made prior to the handoff identifying which cell or cells are to be involved in the handoff. If the cell selection algorithm that is employed is not robust, unnecessary air signaling and call quality degradation may result. Improvements to cell selection algorithms for handoffs can result in a lower call drop rate and better overall network performance.

Prior art cell selection algorithms are based solely on the power levels of neighboring base stations. The wireless mobile station makes pilot signal strength measurements of the candidate base stations and uses the measurements to determine which cell (of a number of candidate cells) is to receive the handoff. This approach can lead to inaccurate decisions if the radio frequency (RF) environment is less than ideal. Specifically, phenomena such as fading, additive combining, and dopplers can produce misleading pilot strength signal readings at the wireless mobile station. Erroneous pilot strength signal readings may cause the base station selection algorithm to select the wrong handoff base station.

There is therefore a need in the art for an improved apparatus and method to enable a wireless mobile station to select an optimal handoff base station (as a target base station) for the handoff of the wireless mobile station from a source base station to the target base station. There is also a need in the art for an improved apparatus and method to provide an improved handoff decision algorithm in a wireless mobile station.

SUMMARY OF THE INVENTION

To address the above-discussed deficiencies of the prior art, it is a primary object of the present invention to provide an apparatus and method for use in a wireless mobile station to select an optimal handoff base station for the handoff of the wireless mobile station from a source base station to a target base station.

Unlike prior art wireless mobile stations, a wireless mobile station that is constructed according to the principles of the present invention allows a handoff decision to be based on more than just pilot strength measurement information. A wireless mobile station of the present invention does use pilot strength measurement information in making a handoff decision. In addition, a wireless mobile station of the present invention may also use one of: (1) the location of the mobile station with respect to the neighboring candidate base stations, (2) the velocity of the mobile station, and (3) the direction of motion of the mobile station. The present invention permits a wireless mobile station to use this additional information (together with the pilot strength measurement information) to select the best or optimal candidate base station for handoff. Incorporating position location information in the handoff decision causes the handoff decision to be more reliable. This reduces the number of erroneous handoffs and results in better system performance.

In one advantageous embodiment the apparatus of the present invention comprises a handoff controller within a wireless mobile station. The handoff controller of the present invention comprises a processor (and associated memory) and a handoff base station selection control program (and associated databases). The handoff base station selection control program is executed by the processor to select an optimal handoff base station for the wireless mobile station.

The handoff controller is capable of receiving location information for the wireless mobile station from a position locator (e.g., Global Positioning System receiver) within the wireless mobile station. The handoff controller also comprises a base station location database that contains location information for candidate base stations that are located near the wireless mobile station. When the wireless mobile station moves into new areas, the handoff controller also receives wireless update messages that contain location information for the candidate base stations that are located in the new areas.

The handoff controller periodically monitors the location information of the wireless mobile station and the candidate base stations. The handoff controller is then able to calculate the location of the wireless mobile station with respect to the candidate base stations, and the velocity and direction of motion of the wireless mobile station. This additional information allows the handoff controller to select an optimum handoff base station for the wireless mobile station.

It is an object of the present invention to provide an apparatus and method for use in a wireless mobile station to select an optimal handoff base station for the handoff of a wireless mobile station from a source base station to a target base station.

It is a further object of the present invention to provide an apparatus and method for selecting an optimal handoff base station that bases a handoff decision on more than just pilot strength measurement information.

It is also an object of the present invention to provide an apparatus and method for creating a preferential order of candidate base stations to which to hand off a wireless mobile station.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile station.

Figure 1:
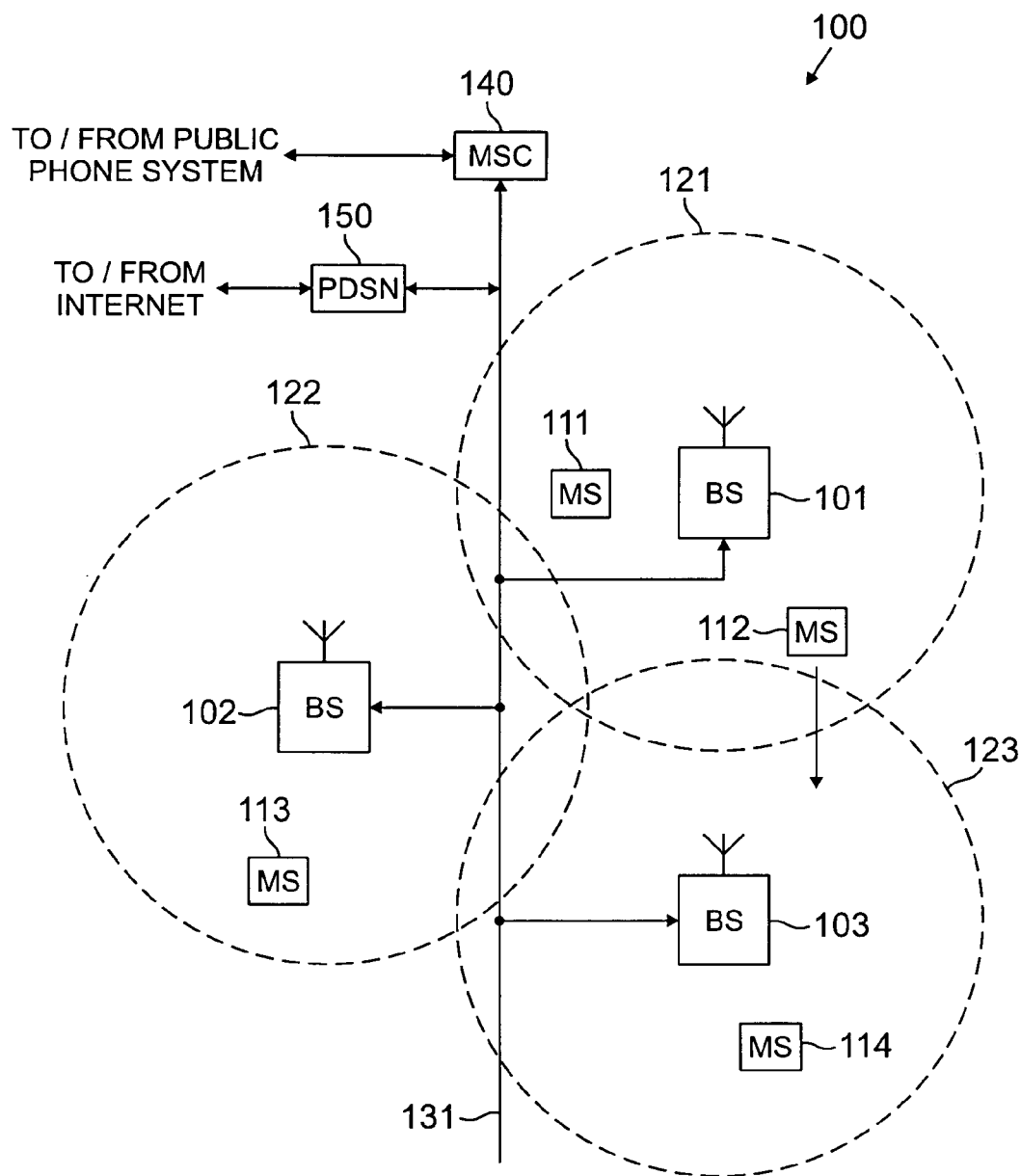
FIG. 1 illustrates an exemplary wireless network according to an advantageous embodiment of the present invention.

FIG. 1 illustrates exemplary wireless network 100 in which the mobile stations operate according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over, for example, code division multiple access (CDMA) channels. Mobile stations 111-114 may be any suitable wireless communication devices, including conventional cellular radiotelephones, Personal Communications System (PCS) handset devices, portable computers, telemetry devices, personal digital assistants, and the like, that are capable of communicating with the base stations via wireless radio links. Other types of access terminals, including fixed wireless access terminals, may also be present in wireless network 100. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any particular cell site configuration.

In one advantageous embodiment of the present invention, each of the base stations BS 101, BS 102, and BS 103 comprise a base station controller (BSC) and one or more base transceiver subsystems (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the radio frequency (RF) transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public switched telephone network (PSTN) and/or the Internet (not shown). Communications line 131 links each vocoder in the base station controller (BSC) with switch elements in the mobile switching center (MSC) 140. In one advantageous embodiment of the present invention, each link provides a digital path for transmission of voice signals in the pulse code modulation (PCM) format. Communications line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

BS 101, BS 102 and BS 103 transfer data signals, such as packet data, between each other and the Internet or other packet data network (not shown) via communications line 131 and packet data serving node (PDSN) 150. Packet data serving node (PDSN) 150 is well known to those skilled in the art.

Communications line 131 also provides a connection path to transfer control signals between MSC 140 and BS 101, BS 102 and BS 103 used to establish connections for voice and data circuits between MSC 140 and BS 101, BS 102 and BS 103. Those skilled in the art will recognize that the connections on communications line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on communications line 131 may provide a transmission path for transmissions of analog or digital control signals in a suitable signaling protocol.

One or more of the wireless devices in wireless network 100 may be capable of executing real time applications, such as streaming audio or streaming video applications. Wireless network 100 receives the real time data from, for example, the Internet through packet data serving node (PDSN) 150 and through communications line 131 and transmits the real time data in the forward channel to the wireless device. For example, MS 112 may comprise a 3G cellular phone device that is capable of surfing the Internet and listening to streaming audio, such as music from a music web site or a sports radio broadcast from a sports web site. To avoid increasing the memory requirements and the size of wireless phone devices, one or more of the base stations in wireless network 100 provides real time data buffers that can be used to buffer real time data being sent to, for example, MS 112.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123. The direction arrow proximate MS 112 indicates the movement of MS 112 towards cell site 123. At some point, as MS 112 moves into cell site 123 and out of cell site 121, a handoff will occur.

As is well known to those skilled in the art, the hand-off procedure transfers control of a call from a first cell site to a second cell site. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell.

For example, assume that mobile stations 111-114 communicate with base stations BS 101, BS 102 and BS 103 over code division multiple access (CDMA) channels. As MS 112 moves from cell 121 to cell 123, MS 112 detects the pilot signal from BS 103 and sends a Pilot Strength Measurement Message (PSMM) to BS 101. When the strength of the pilot that is transmitted by BS 103 and received and reported by MS 112 to BS 101 exceeds a threshold, BS 101 initiates a handoff process by signaling MS 112 and the target BS 103 that a handoff is required. The details of the handoff process are described in TIA/EIA IS-95 or TIA/EIA IS-2000 family of standards.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that a soft handoff improves the performance on both the forward channel (BS to MS) links and the reverse channel (MS to BS) links. When the signal from BS 101 falls below a predetermined signal strength threshold, MS 112 may then drop the link with BS 101 and only receive signals from BS 103. The call is thereby seamlessly transferred from BS 101 to BS 103. The soft handoff described above assumes that the mobile station is in a voice or data call. An idle handoff is a handoff between cells of a mobile device that is communicating in the control or paging channel, rather than transmitting voice and/or data signals in the regular traffic channels.

As shown in FIG. 1, MS 112 is moving from BS 101 towards BS 103. If perfect radio frequency (RF) conditions existed (no multipath, no fading, no combining, etc.) then the cell under control of BS 103 would be the ideal candidate for a handoff. But in the real world the radio frequency (RF) conditions are never ideal. For example, MS 112 may be experiencing additive combining from the pilot from a cell governed by BS 102. This would cause the pilot strength measurement for the cell of BS 102 to appear superior for a certain amount of time. MS 112 will report this high pilot strength to source BS 101 in a Pilot Strength Measurement Message (PSMM).

In prior art systems the handoff process is dependent solely on the pilot strength measurement. In a prior art system source BS 101 may decide to hand off MS 112 to BS 102 rather than BS 103. The handoff of MS 112 to BS 102 instead of BS 103 may lead to the call being dropped. Because MS 112 is moving toward BS 103 and not toward BS 102, at some point MS 112 will have to be handed off to BS 103. This will require an additional handoff. Therefore erroneously handing off MS 112 to BS 102 instead of to BS 103 unnecessarily uses resources.

Unlike prior art mobile stations, a mobile station that is constructed according to the principles of the present invention allows a handoff decision to be based on more than just pilot strength measurement information. A mobile station of the present invention does use pilot strength measurement information in making a handoff decision. In addition, as will be more fully described, a mobile station of the present invention may also use one of: (1) the location of the mobile station with respect to the neighboring candidate base stations, (2) the velocity of the mobile station, and (3) the direction of motion of the mobile station. The present invention permits a mobile station to use this additional information (together with the pilot strength measurement information) to select the best or optimal candidate base station for handoff. Incorporating position location information in the handoff decision causes the handoff decision to be more reliable. This reduces the number of unnecessary handoffs and results in better system performance.

Figure 2:
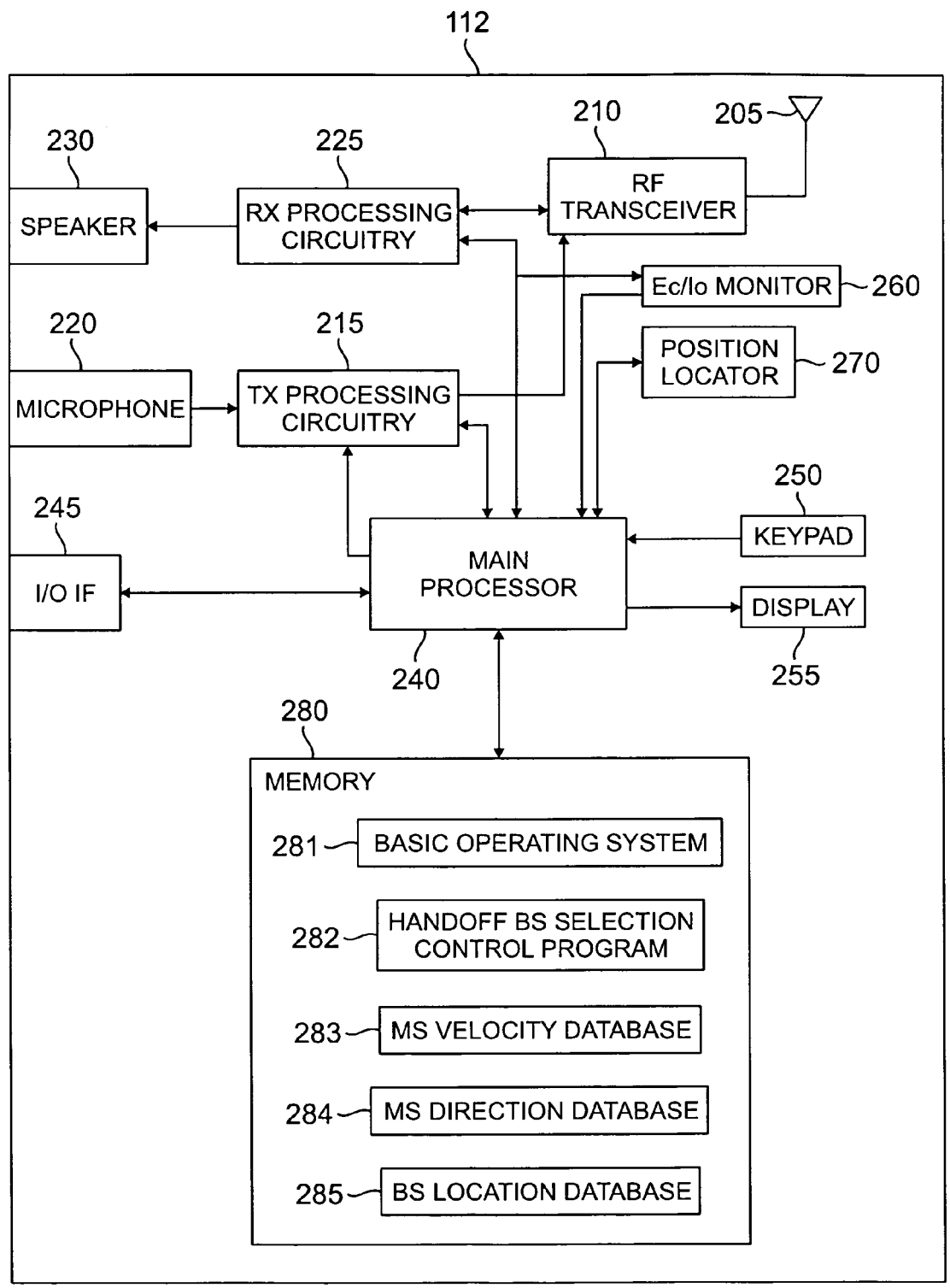
FIG. 2 illustrates an exemplary wireless mobile station in greater detail according to an advantageous embodiment of the present invention.
Figure 3:
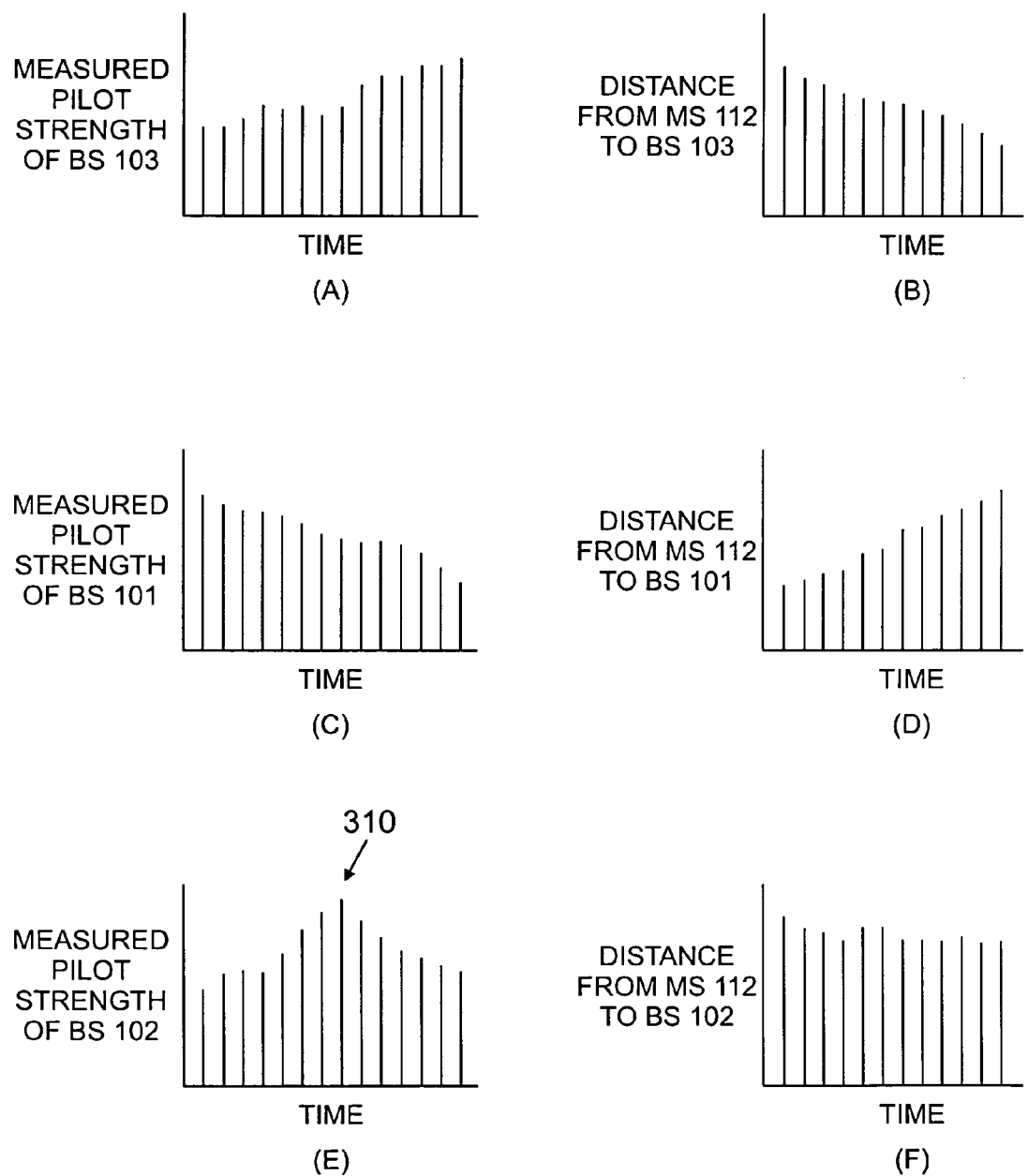
FIG. 3 is a diagram showing exemplary pilot strength measurements over time for three candidate base stations and measurements over time of distance from a mobile station to each of the three candidate base stations.

FIG. 2 illustrates one advantageous embodiment of wireless mobile station 112 in accordance with the principles of the present invention. Wireless mobile station 112 comprises antenna 205, radio frequency (RF) transceiver 210, transmitter (TX) processing circuitry 215, microphone 220, receiver (RX) processor circuitry 225, speaker 230, main processor 240, input/output (I/O) interface (IF) 245, keypad 250, display 255, and memory 280. Memory 280 further comprises basic operating system (OS) program 281, handoff base station selection control program 282, mobile station velocity database 283, mobile station direction database 284, and base station location database 285.

Wireless mobile station 112 further comprises $E_C/I_O$ monitor 260. $E_C/I_O$ monitor 260 monitors the "signal to noise ratio" (SNR) of the incoming forward channel signals transmitted by the base stations and received by receiver (RX) processing circuitry 225. Main processor 240 stores the $E_C/I_O$ ratio data from $E_C/I_O$ monitor 260 in memory locations (not shown) within memory 280. Main processor 240 stores the $E_C/I_O$ ratio data over time for each base station within the active set and the neighbor set.

Wireless mobile station 112 further comprises position locator 270. In one advantageous embodiment of the present invention, position locator 270 comprises a global positioning system (GPS) receiver. It is understood that other types of position location equipment may be employed. Position locator 270 (hereafter occasionally referred to as global positioning system (GPS) receiver 270) may comprise, for example, a time of arrival (TOA) position locator system, a time difference of arrival (TDOA) position locator system, or an angle of arrival (AOA) position locator system. These types of position locator systems are well known in the art. Other types of position locator systems may also be used. For purposes of describing the present invention it will be assumed that position locator 270 is a global positioning system (GPS) receiver 270.

Radio frequency (RF) transceiver 210 receives from antenna 205 an incoming RF signal transmitted by a base station of wireless network 100. Radio frequency (RF) transceiver 210 down-converts the incoming RF signal to produce an intermediate frequency (IF) or a baseband signal. The IF or baseband signal is sent to receiver (RX) processing circuitry 225 that produces a processed baseband signal by filtering, decoding, and/or digitizing the baseband or IF signal to produce a processed baseband signal. Receiver (RX) processing circuitry 225 transmits the processed baseband signal to speaker 230 (i.e., voice data) or to main processor 240 for further processing (e.g., web browsing).

Transmitter (TX) processing circuitry 215 receives analog or digital voice data from microphone 220 or other outgoing baseband data (e.g., web data, e-mail, interactive video game data) from main processor 240. Transmitter (TX) processing circuitry 215 encodes, multiplexes, and/or digitizes the outgoing baseband data to produce a processed baseband or IF signal. Radio frequency (RF) transceiver 210 receives the outgoing processed baseband or IF signal from transmitter (TX) processing circuitry 215. Radio frequency (RF) transceiver 210 up-converts the baseband or IF signal to a radio frequency (RF) signal that is transmitted via antenna 205.

In an advantageous embodiment of the present invention, main processor 240 is a microprocessor or microcontroller. Memory 280 is coupled to main processor 240. Memory 280 may comprise solid state memory such as random access memory (RAM), various types of "read only" memory (ROM), or Flash RAM. Memory 280 may also comprise other types of memory such as "micro" hard drives or removable storage media that store data.

Main processor 240 executes basic operating system (OS) program 281 stored in memory 280 in order to control the overall operation of wireless mobile station 112. In one such operation, main processor 240 controls the reception of forward channel signals and the transmission of reverse channel signals by radio frequency (RF) transceiver 210, receiver (RX) processing circuitry 225, and transmitter (TX) processing circuitry 215, in accordance with well known principles.

Main processor 240 is capable of executing other processes and programs resident in memory 280. Main processor 240 can move data into or out of memory 280, as required by an executing process. Main processor 240 is also coupled to I/O interface 245. I/O interface 245 provides mobile station 112 with the ability to connect to other devices such as laptop computers and handheld computers. I/O interface 245 is the communication path between these accessories and main controller 240.

Main processor 240 is also coupled to keypad 250 and display unit 255. The end user of mobile station 112 uses keypad 250 to enter data into mobile station 112. Display 255 may be a liquid crystal display capable of rendering text and/or at least limited graphics from web sites. Alternate embodiments may use other types of displays.

Main processor 240 is also capable of controlling and/or interfacing with $E_C/I_O$ monitor 260 and position locator 270. Under the control of main processor 240, handoff base station selection control program 282 is able to obtain pilot strength measurements of the base stations in the active set and in the neighbor set of mobile station 112. Also under the control of main processor 240, handoff base station selection control program 282 is able to obtain the location of mobile station 112 from position locator 270.

The locations of the base stations in the active set and in the neighboring set have previously been stored in base station location database 285. The locations of the base stations may be in the form of latitude and longitude coordinates. When wireless mobile station 112 enters a new area, latitude and longitude coordinates for the newly accessible neighbor base stations are sent to wireless mobile station 112 in a Neighbor List Update Message (NLUM) or in an Extended Neighbor List Update Message (ENLUM). The NLUM and ENLUM messages are sent on the traffic channel. In addition, the base stations may be configured to transmit their latitude and longitude coordinates in a Systems Parameters Message (SPM). The latitude and longitude coordinates for the newly accessible neighbor base stations are stored in base station location database 285 in memory 280.

Main processor 240 executes handoff base station selection control program 282 to execute the base station selection algorithm of the present invention. As will be more fully described, the base station selection algorithm identifies a preferential order of candidate base stations for the handoff of wireless mobile station 112. Main processor 240 and handoff base station selection control program 282 comprise a handoff controller that is capable of executing the base station selection algorithm of the present invention.

Main processor 240 executes handoff base station selection control program 282 and uses data from position locator 270 to determine the location of wireless mobile station 112 with respect to the location of neighboring candidate base stations. Handoff base station selection control program 282 stores each location of wireless mobile station 112 obtained from position locator 270 in a memory location (not shown) within memory 280. Handoff base station selection control program 282 continues to read and store the location information of wireless mobile station 112 over time.

Main processor 240 executes handoff base station selection control program 282 and uses the location data received from position locator 270 to periodically calculate the velocity of wireless mobile station 112. Handoff base station selection control program 282 obtains a first location of wireless mobile station 112 at a first time (denoted "t1"). Handoff base station selection control program 282 then obtains a second location of wireless mobile station 112 at a second later time (denoted "t2"). Handoff base station selection control program 282 then calculates the average velocity of wireless mobile station 112 (from time t1 to time t2) by dividing the magnitude of the change of location of mobile station 112 (i.e., the location of wireless mobile station 112 at time t2 minus the location of wireless mobile station 112 at time t1) by the time difference (i.e., time t2 minus time t1) Handoff base station selection control program 282 then stores the calculated value of the average velocity of wireless mobile station 112 in a memory location (not shown) in mobile station velocity database 283 in memory 280.

Main processor 240 executes handoff base station selection control program 282 and uses the location data received from position locator 270 to periodically calculate the direction of motion of wireless mobile station 112. Handoff base station selection control program 282 uses the first location of wireless mobile station 112 at time t1 and the second location of wireless mobile station 112 at time t2 to determine the direction of motion of wireless mobile station 112 from time t1 to time t2. Handoff base station selection control program 282 then stores the calculated value of the direction of motion of wireless mobile station 112 in a memory location (not shown) in mobile station direction database 284 in memory 280.

Handoff base station selection control program 282 determines an optimal handoff base station for wireless mobile station 112 by analyzing (1) the location of wireless mobile station 112 with respect to the neighboring candidate base stations, (2) the velocity of wireless mobile station 112, (3) the direction of motion of wireless mobile station 112, and (4) the pilot signal strengths of the neighboring candidate base stations. The determination of an optimal handoff base station is not determined solely on the basis of pilot signal strength of the neighboring candidate base stations.

In addition to continually monitoring the pilot signal strength of the neighboring candidate base stations, handoff base station selection control program 282 continually marks the location of wireless mobile station 112 and computes the distance to the neighboring candidate base stations. Handoff base station selection control program 282 uses these distance measurements over time to project the path of wireless mobile station 112 towards (or away from) the neighboring candidate base stations. Handoff base station selection control program 282 uses an average measurement over a period of time in order to avoid short term fluctuations in velocity, direction of motion, or detected pilot signal strength levels. Handoff base station selection control program 282 uses these parameters to make an optimal handoff decision (i.e., to find the optimal handoff target base station for wireless mobile station 112).

As shown in FIG. 1, mobile station 112 is moving away from base station 101 towards base station 103. As shown in FIG. 3(C) and in FIG. 3(D), the measurements obtained by handoff base station selection control program 282 indicate that the pilot strength of base station 101 is decreasing and the distance from wireless mobile station 112 to base station 101 is increasing. As shown in FIG. 3(A) and in FIG. 3(B), the measurements obtained by handoff base station selection control program 282 indicate that the pilot strength of base station 103 is increasing and the distance from wireless mobile station 112 to base station 103 is decreasing.

As shown in FIG. 3(E) and in FIG. 3(F), the measurements obtained by handoff base station selection control program 282 indicate that the pilot strength of base station 102 is initially increasing to a maximum 310. Maximum 310 may represent a radio frequency (RF) anomaly. If the handoff decision were to be based solely on the pilot strength of the neighboring candidate base stations, then the handoff would go to base station 102. However, measurements obtained by handoff base station selection control program 282 indicate that the distance from wireless mobile station 112 to base station 102 is not significantly decreasing. Therefore, the increase of the pilot strength of base station 102 to a maximum 310 is disregarded in making the handoff decision. Therefore, base station 103 and not base station 102 is selected as the optimum target base station for the handoff of wireless mobile station 112. In this manner an unnecessary handoff to base station 102 is avoided.

Handoff base station selection control program 282 performs the calculations described above to find the most preferred candidate base station for handoff. Handoff base station selection control program 282 then evaluates all of the remaining candidate base stations and prepares a preferred order (i.e., ranking) of candidate base stations for handoff. The most preferred candidate base station is the first base station listed in the preferential order of candidate base stations.

Handoff base station selection control program 282 then sends the preferential order of candidate base stations to the source base station. The source base station in the example set forth above is base station 101. The most preferred candidate base station in the preferential order of candidate base stations in this example is base station 103. Source base station 101 then selects base station 103, the most preferred candidate base station in the preferential list of candidate base stations, to be the target base station to which mobile station 112 is to be handed off.

In an alternate advantageous embodiment of the invention, handoff base station selection control program 282 may select more than one candidate base station as a preferred candidate base station. That is, at a particular point in time there may be two (or more) candidate base stations that are considered to be equally well qualified as target base stations for handoff.

Figure 4:
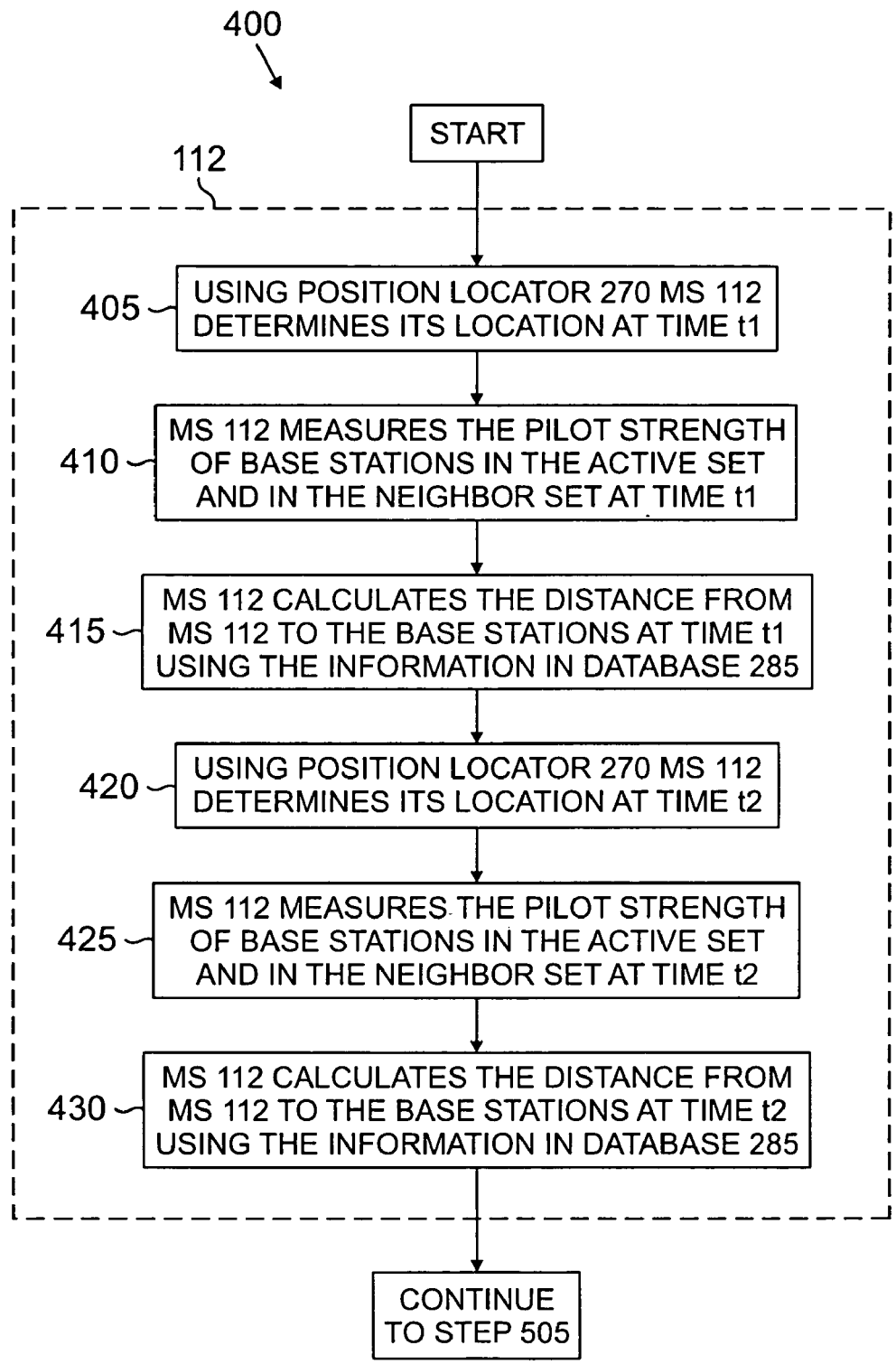
FIG. 4 is a flow diagram illustrating a first portion of the operation of an exemplary wireless mobile station according to an advantageous embodiment of the present invention.
Figure 5:
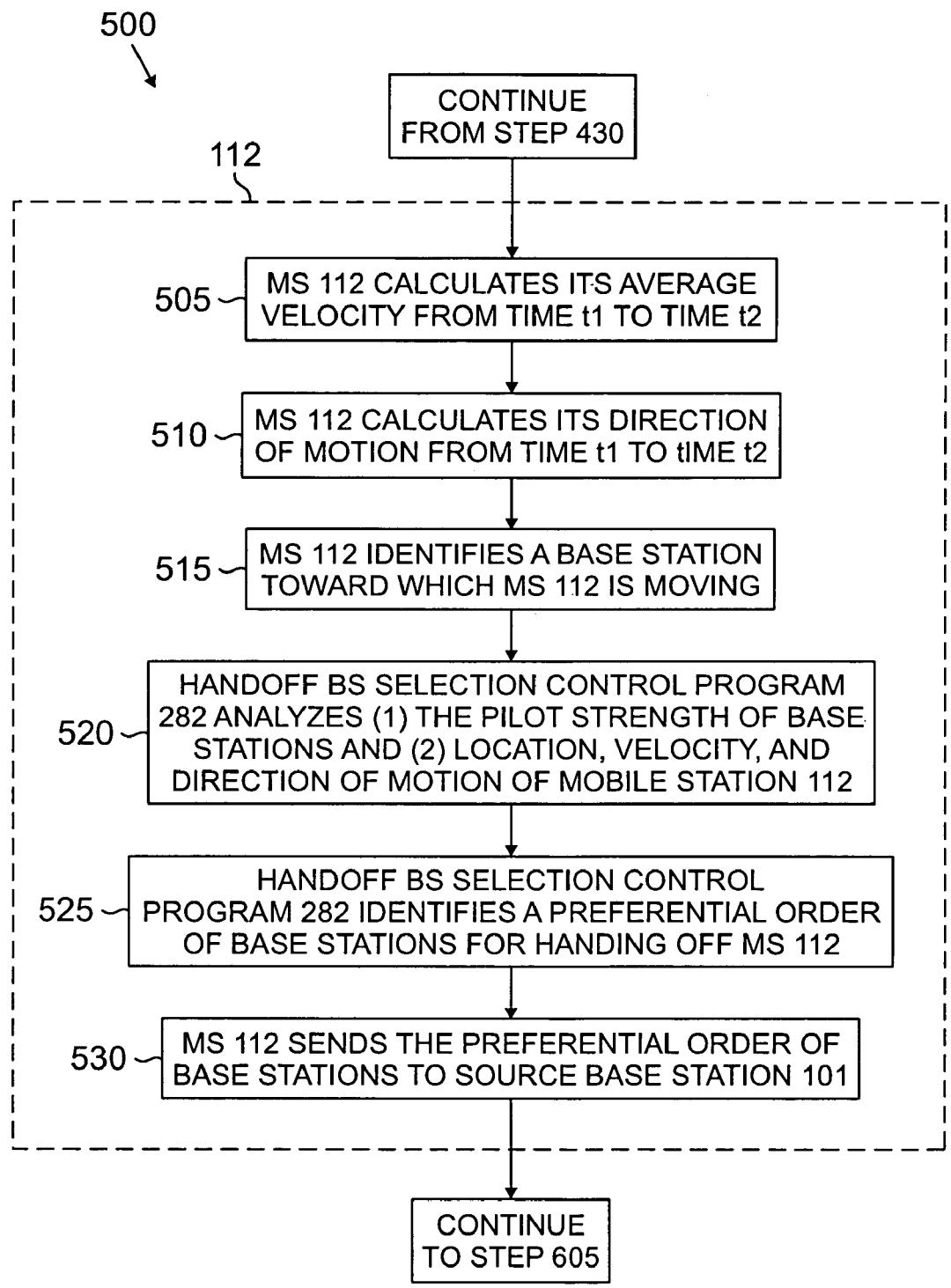
FIG. 5 is a flow diagram illustrating a second portion of the operation of an exemplary wireless mobile station according to an advantageous embodiment of the present invention.
Figure 6:
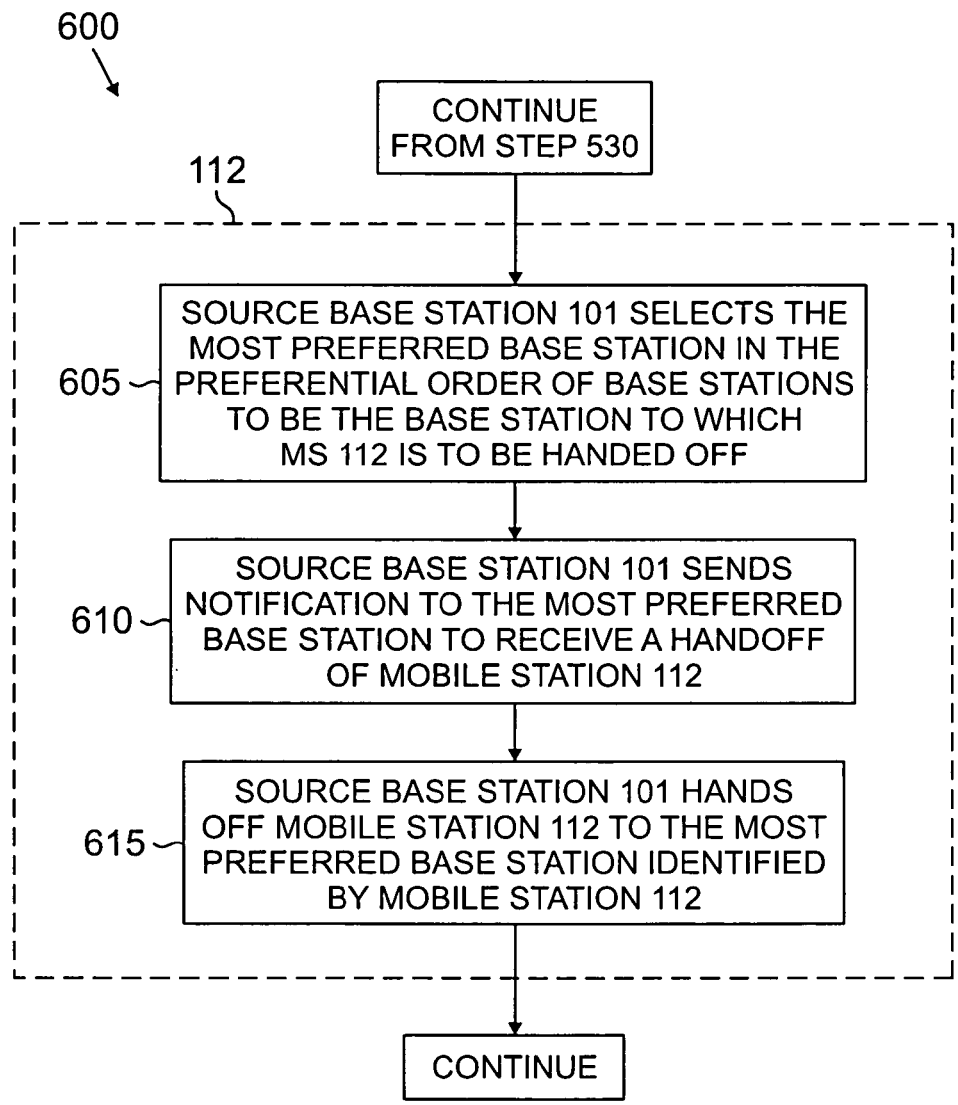
FIG. 6 is a flow diagram illustrating a third portion of the operation of an exemplary wireless mobile station according to an advantageous embodiment of the present invention.

FIGS. 4, 5 and 6 comprise a flow diagram illustrating the operation of mobile station 112 according to an advantageous embodiment of the present invention. The steps in FIG. 4 are collectively referred to with reference numeral 400. The steps in FIG. 5 are collectively referred to with reference numeral 500. The steps in FIG. 6 are collectively referred to with reference numeral 600.

As previously described, the handoff controller of mobile station 112 comprises main processor 240 and handoff base station selection control program 282. The steps of the method of the present invention are performed by the handoff controller within mobile station 112. However, for simplicity, the term "mobile station 112" will be used in the description of the method that follows. It is understood that this term refers to a mobile station comprising a handoff controller of the present invention.

At a first time (denoted "t1") mobile station 112 uses position locator 270 to determine the location of mobile station 112 (step 405). Also at time t1 mobile station 112 measures the pilot strength of base stations in the active set and in the neighbor set (step 410). Mobile station 112 then calculates the distance from mobile station 112 to each of the candidate base stations at time t1 using base station location information that is stored in base station location database 285 (step 415).

At a second later time (denoted "t2") mobile station 112 uses position locator 270 to determine the location of mobile station 112 (step 420). Also at time t2 mobile station 112 measures the pilot strength of the base stations in the active set and in the neighbor set (step 425). Mobile station 112 then calculates the distance from mobile station 112 to each of the candidate base stations at time t2 using base station location information that is stored in base station location database 285 (step 430).

Mobile station 112 then calculates its average velocity from time t1 to time t2 (step 505). Mobile station 112 calculates its average velocity by dividing its location change (i.e., the location of MS 112 at time t2 minus the location of MS 112 at time t1) by the time difference (i.e., time t2 minus time t1). Mobile station 112 may store the calculated value of average velocity in mobile station velocity database 283. Mobile station 112 then calculates its direction of motion from time t1 to time t2 (step 510). Mobile station 112 calculates its direction of motion from the location of MS 112 at time t2 and the location of MS 112 at time t1. Mobile station 112 may store the calculated direction of motion in mobile station direction database 284.

Mobile station 112 uses its calculated direction of motion and the locations of the candidate base stations stored in base station location database 285 to identify a candidate base station toward which mobile station 112 is moving (step 515). Handoff base station selection control program 282 of mobile station 112 then analyzes (1) the pilot strength of the candidate base stations in the active set and in the neighbor set, and (2) the location, velocity, and direction of motion of mobile station 112 (step 520). From this analysis handoff base station selection control program 282 of mobile station 112 identifies a preferential order of candidate base stations to which mobile station 112 is to be handed off (step 525). The most preferred candidate base station is the first base station listed in the preferential order of candidate base stations.

Mobile station 112 then sends the preferential order of candidate base stations to the source base station (step 530).

The source base station in this example is base station 101. Source base station 101 selects the most preferred candidate base station in the preferential list of candidate base stations to be the target base station to which mobile station 112 is to be handed off (step 605).

Source base station 101 then sends notification to the most preferred candidate base station (base station 103 in this example) to receive a handoff of mobile station 112 (step 610). Source base station 101 then hands off mobile station 112 to the most preferred candidate base station that has been identified by mobile station 112 (step 615). In this manner mobile station 112 is handed off to an optimal target base station.

In order to support the present invention the following messages will need to be modified: (1) Neighbor List Message (NLM), (2) Universal Neighbor List Message (UNLM), (3) Private Neighbor List Message (PNLM), (4) General Neighbor List Message (GNLM), (5) Extended Neighbor List Message (ENLM), (6) Neighbor List Update Message (NLUM), and (7) Extended Neighbor List Update Message (ENLUM). In each case, each message needs to be modified to add latitude and longitude coordinate information for the neighbor base stations.

The present invention provides several advantages over the prior art. Because the handoff decision in the present invention uses additional decision parameters and is not based solely on pilot strength information, the call drop rate is significantly reduced. This results in more successful call completion ratios.

Because the number of unnecessary handoffs is reduced, network performance is improved and air resources are conserved. The overall system capacity is also increased because links that would otherwise be wrongly assigned for handoffs are available for other traffic. Call quality is also improved because there are fewer handoffs to improper base stations. There is a reduction in the amount of interference because there is less signaling due to fewer unnecessary handoffs.

Although the present invention has been described in detail, those skilled in the art should understand that they can make various changes, substitutions and alterations herein without departing from the spirit and scope of the invention in its broadest form.

What is claimed is:

1. For use in a wireless mobile station capable of communicating with a wireless network, an apparatus for selecting at least one target base station for a handoff of said wireless mobile station, said apparatus comprising:
   a handoff controller capable of selecting said at least one target base station based on pilot signal strength information of at least two candidate base stations and one of:
   a location of said wireless mobile station;
   a velocity of said wireless mobile station; and
   a direction of motion of said wireless mobile station,
   wherein said handoff controller is capable of calculating a distance of said wireless mobile station to at least one candidate base station and creating a preferential order of candidate base stations to which to hand off said wireless mobile station based on said pilot strength information of said at least one target base station and position location information of said wireless mobile station.

2. The apparatus as set forth in claim 1 wherein said handoff controller comprises;
   a processor within said wireless mobile station;
   a memory coupled to said processor; and a handoff base station selection control program within said memory, said handoff base station selection control program executable by said processor to select said at least one target base station for said handoff of said wireless mobile station.

3. The apparatus as set forth in claim 2 wherein said handoff controller further comprises:
a base station location database within said memory, said base station location database containing location information of at least one candidate base station;
wherein said handoff controller is capable of receiving a message that contains base station location information; and
wherein said handoff controller is capable of placing said base station location information from said message in said base station location database.

4. The apparatus as set forth in claim 1 wherein calculating the distance of said wireless mobile station to at least one candidate base station further comprises receiving a location of said wireless mobile station.

5. The apparatus as set forth in claim 1 wherein said handoff controller is capable of receiving a first location of said wireless mobile station at a first time and a second location of said wireless mobile station at a second time and calculating a velocity of said wireless mobile station.

6. The apparatus as set forth in claim 1 wherein said handoff controller is capable of receiving a first location of said wireless mobile station at a first time and a second location of said wireless mobile station at a second time and calculating a direction of motion of said wireless mobile station.

7. The apparatus as set forth in claim 1 wherein said position location information comprises at least one of:
a location of said wireless mobile station;
a velocity of said wireless mobile station; and
a direction of motion of said wireless mobile station.

8. A wireless mobile station comprising:
an apparatus for selecting at least one target base station for a handoff of said wireless mobile station, said apparatus comprising:
a handoff controller capable of selecting said at least one target base station based on pilot signal strength information of at least two candidate base stations and one of:
a location of said wireless mobile station;
a velocity of said wireless mobile station; and
a direction of motion of said wireless mobile station,
wherein said handoff controller is capable of calculating a distance of said wireless mobile station to at least one candidate base station and creating a preferential order of candidate base stations to which to hand off said wireless mobile station based on said pilot strength information of said at least one target base station and position location information of said wireless mobile station.

9. The wireless mobile station as set forth in claim 8 wherein said handoff controller comprises:
a processor within said wireless mobile station;
a memory coupled to said processor; and
a handoff base station selection control program within said memory, said handoff base station selection control program executable by said processor to select said at least one target base station for said handoff of said wireless mobile station.

10. The wireless mobile station as set forth in claim 9 wherein said handoff controller further comprises:

a base station location database within said memory, said base station location database containing location information of at least one candidate base station;
wherein said handoff controller is capable of receiving a message tat contains base station location information; and
wherein said handoff controller is capable of placing said base station location information from said message in said base station location database.

11. The wireless mobile station as set forth in claim 8 wherein calculating the distance of said wireless mobile station to at least one candidate base station further comprises.

12. The wireless mobile station as set forth in claim 8 wherein said handoff controller is capable of receiving a first location of said wireless mobile station at a first time and a second location of said wireless mobile station at a second time and calculating a velocity of said wireless mobile station.

13. The wireless mobile station as set forth in claim 8 wherein said handoff controller is capable of receiving a first location of said wireless mobile station at a first time and a second location of said wireless mobile station at a second time and calculating a direction of motion of said wireless mobile station.

14. The wireless mobile station as set forth in claim 8 wherein said position location information comprises at least one of:
a location of said wireless mobile station;
a velocity of said wireless mobile station; and
a direction of motion of said wireless mobile station.

15. For use in a wireless mobile station in a wireless network capable of communicating with wireless mobile stations located in a coverage area of the wireless network, a method for selecting at least one target base station for a handoff of a wireless mobile station, said method comprising the steps of:
receiving within a handoff controller within said wireless mobile station pilot signal strength information of at least two candidate base stations;
receiving within said handoff controller one of: a location of said wireless mobile station, a velocity of said wireless mobile station, and a direction of motion of said wireless mobile station;
selecting said at least one target base station based on said pilot signal strength information of said at least two candidate base stations and one of: said location of said wireless mobile station, said velocity of said wireless mobile station, and said direction of motion of said wireless mobile station;
calculating in said handoff controller a distance of said wireless mobile station to at least one candidate base station; and
creating a preferential order of candidate base stations to which to hand off said wireless mobile station based on said pilot strength information of said at least two candidate base stations and said position location of said wireless mobile station.

16. The method as set forth in claim 15 further comprising the steps of;
coupling a base station location database to said handoff controller, said base station location database containing location information of at least one candidate base station;
receiving a message within said handoff controller that contains base station location information; and placing said base station location information from said message in said base station location database.

17. The method as set forth in claim 15 wherein calculating the distance of said wireless mobile station to at least one candidate station further comprises:
   receiving a location of said wireless mobile station within said handoff controllers.

18. The method as set forth in claim 15 wherein calculating the distance of said wireless mobile station to at least one candidate base station further comprises the steps of:
   receiving within said handoff controller a first location of said wireless mobile station at a first time; and
   receiving within said handoff controller a second location of said wireless mobile station at a second time.

19. The method as set forth in claim 15 calculating the distance of said wireless mobile station to at least one candidate base station further comprises the steps of:
   receiving within said handoff controller a first location of said wireless mobile station at a first time; and
   receiving within said handoff controller a second location of said wireless mobile station at a second time.

20. The method as set forth in claim 15 wherein said position location information comprises at least one of:
   said location of said wireless mobile station;
   said velocity of said wireless mobile station; and
   said direction of motion of said wireless mobile station.

* * * * *